(12) United States Patent
Hsieh et al.

(10) Patent No.: US 8,060,037 B2
(45) Date of Patent: Nov. 15, 2011

(54) CIRCUIT AND METHOD OF CALIBRATING DIRECT CURRENT OFFSET IN WIRELESS COMMUNICATION DEVICE

(75) Inventors: Ming-Yu Hsieh, Hsinchu County (TW); Hsu-Hung Chang, Tai-Chung (TW)

(73) Assignee: MStar Semiconductor, Inc., Tai-Yuan St., ChuPei, Hsin-Chu Hsien (TW)

( * ) Notice: Subject to any disclaimer, the term of this patent is extended or adjusted under 35 U.S.C. 154(b) by 493 days.

(21) Appl. No.: 12/394,048

(22) Filed: Feb. 27, 2009

(65) Prior Publication Data

US 2009/0247102 A1 Oct. 1, 2009

(30) Foreign Application Priority Data

Mar. 25, 2008 (TW) .............................. 97110564 A (51) Int. Cl.
*H03C 1/62* (2006.01)
(52) U.S. Cl. ................ 455/115.1; 455/114.2; 455/115.2
(58) Field of Classification Search ............... 455/114.2, 455/115.1, 115.2
See application file for complete search history.

(56) References Cited

U.S. PATENT DOCUMENTS

| | | | |
|---|---|---|---|
| 6,704,551 B2 | 3/2004 | Riou et al. | |
| 6,763,227 B2 * | 7/2004 | Kramer | 455/115.1 |
| 6,973,295 B2 * | 12/2005 | Gunzelmann | 455/115.1 |
| 7,010,278 B2 * | 3/2006 | Kirschenmann et al. | 455/114.2 |
| 7,409,194 B2 * | 8/2008 | Shi et al. | 455/126 |
| 7,734,261 B2 * | 6/2010 | Bury | 455/115.1 |
| 7,953,379 B2 * | 5/2011 | Poloni | 455/115.1 |

FOREIGN PATENT DOCUMENTS

| | | |
|---|---|---|
| CN | 101072040 A | 11/2007 |
| EP | 1 478 097 A1 | 11/2004 |

* cited by examiner

*Primary Examiner* — Hai L Nguyen

(74) *Attorney, Agent, or Firm* — Winston Hsu; Scott Margo (57) ABSTRACT

A circuit for calibrating the DC offset in a wireless communication device utilizes a voltage-generating circuit to generate a first voltage value and its negative value, and utilizes a detecting circuit to detect an output of the wireless communication device and generate a first target-branch reference value corresponding to the power of the output when the first voltage value is inputted into a target branch (e.g., the in-phase branch or the quadrature branch) of the wireless communication device, and detect an output of the wireless communication device and generate a second target-branch reference value corresponding to the power of the output when the negative value of the first voltage value is input into the target branch. Then, an estimating circuit estimates the DC offset on the target branch according to the first and second target-branch reference values and the first voltage value.

20 Claims, 4 Drawing Sheets

CIRCUIT AND METHOD OF CALIBRATING DIRECT CURRENT OFFSET IN WIRELESS COMMUNICATION DEVICE

BACKGROUND OF THE INVENTION

1. Field of the Invention

The present invention relates to a DC offset calibration circuit and related method applied to a wireless communication device, and more particularly, to a circuit and related method for generating a calibration signal that can be converged quickly by using analysis formulae to calibrate carrier leakage, wherein the calibration circuit and related method are not affected by the process variations at the transmitting end of the wireless communication device.

2. Description of the Prior Art

A mixer in a wireless communication transmitter is utilized for carrying a base-band modulation signal on a high frequency carrier, so as to enable the base-band modulation signal to be transmitted over a channel having a specific frequency band. The non-ideal effect of a radio-frequency circuit element, asymmetrical circuit layout, or circuit mismatch, may cause an undesired DC offset at the input of the mixer, however. The DC offset is mixed with an output signal of a local oscillator via the mixer to generate unwanted carrier leakage at the output of the mixer. This will not only leads to a decline in the performance of the mixer, causing the subsequent circuits to become saturated, but also result in the transmitting bandwidth of the wireless communication transmitter to exceed the spectra mask specified by the communication standard such that the communication quality of the other subscribers will be influenced.

In order to compensate the carrier leakage caused by the DC offset to make the transmit bandwidth comply with the specified spectra mask, a conventional scheme sends test signals into the mixer repeatedly until one of the test signals is found to be able to cancel out the DC offset. The U.S. Pat. No. 6,704,551 provides an example of the conventional scheme. The steps of generating the found test signal comprise: generating a DC compensation signal having n bits, and then gradually adjusting each of the n bits of the DC compensation signal by using the binary search algorithm. Since the number of times 1.2 n-2 n for calibration is required during the adjustment from the most significant bit (MSB) to the least significant bit (LSB), and the in-phase and quadrature branches need to be processed separately, a total of 2.4 n-4 n number of times for calibration is necessary. A much longer convergence time is therefore required to generate the desired DC compensation signal.

SUMMARY OF THE INVENTION

Therefore, one of the objectives of the present invention is to provide a method and related circuit for estimating a DC offset in a wireless communication device by using analysis formulae; the method is not only simple but can also quickly and correctly estimate the DC offset. In addition, when being applied for calibrating the carrier leakage, the method can rapidly produce a converged calibration signal to calibrate the carrier leakage, wherein the converged calibration signal is not affected by the process errors or the process variations at the transmitting end of the wireless communication device.

According to an embodiment of the present invention, a method for estimating a DC offset in a wireless communication device is provided. The method comprises the following steps: generating a first voltage value; inputting the first voltage value into a target branch of the wireless communication device and then detecting an output signal of the wireless communication device to generate a first target-branch reference value corresponding to a power of the output signal; generating and inputting a negative value of the first voltage value into the target branch, and then detecting the output signal of the wireless communication device to generate a second target-branch reference value corresponding to the power of the output signal; and estimating a DC offset on the target branch of the wireless communication device according to the first target-branch reference value, the second target-branch reference value, and the first voltage value.

According to another embodiment of the present invention, a circuit for estimating a DC offset in a wireless communication device is provided. The circuit comprises a voltage-generating circuit, a detecting circuit, and an estimating circuit coupled to the voltage-generating circuit and the detecting circuit. The voltage-generating circuit generates a first voltage value and a negative value of the first voltage value, and inputs the first voltage value and its negative value in sequence into a target branch of the wireless communication device. The detecting circuit detects an output signal of the wireless communication device to generate a first target-branch reference value corresponding to a power of the output signal when the voltage-generating circuit inputs the first voltage value into the target branch. The detecting circuit further detects the output signal of the wireless communication device to generate a second target-branch reference value corresponding to the power of the output signal when the voltage-generating circuit inputs the negative value of the first voltage value into the target branch. The estimating circuit is subsequently arranged to estimate a DC offset on the target branch of the wireless communication device according to the first target-branch reference value, the second target-branch reference value, and the first voltage value.

In the above-mentioned embodiments, the division operation can be changed to be implemented by a shift register, which performs n shifts on a dividend represented by a binary number; or an accumulation circuit, which accumulates a divisor until an accumulated result approximates or equals the dividend, may be used instead of using a divider. In the case of the accumulation circuit, the number of times that the divisor is accumulated is exactly equal to the desired quotient. Accordingly, the circuit architecture of the disclosed embodiments can be simplified and the production costs can be further reduced.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
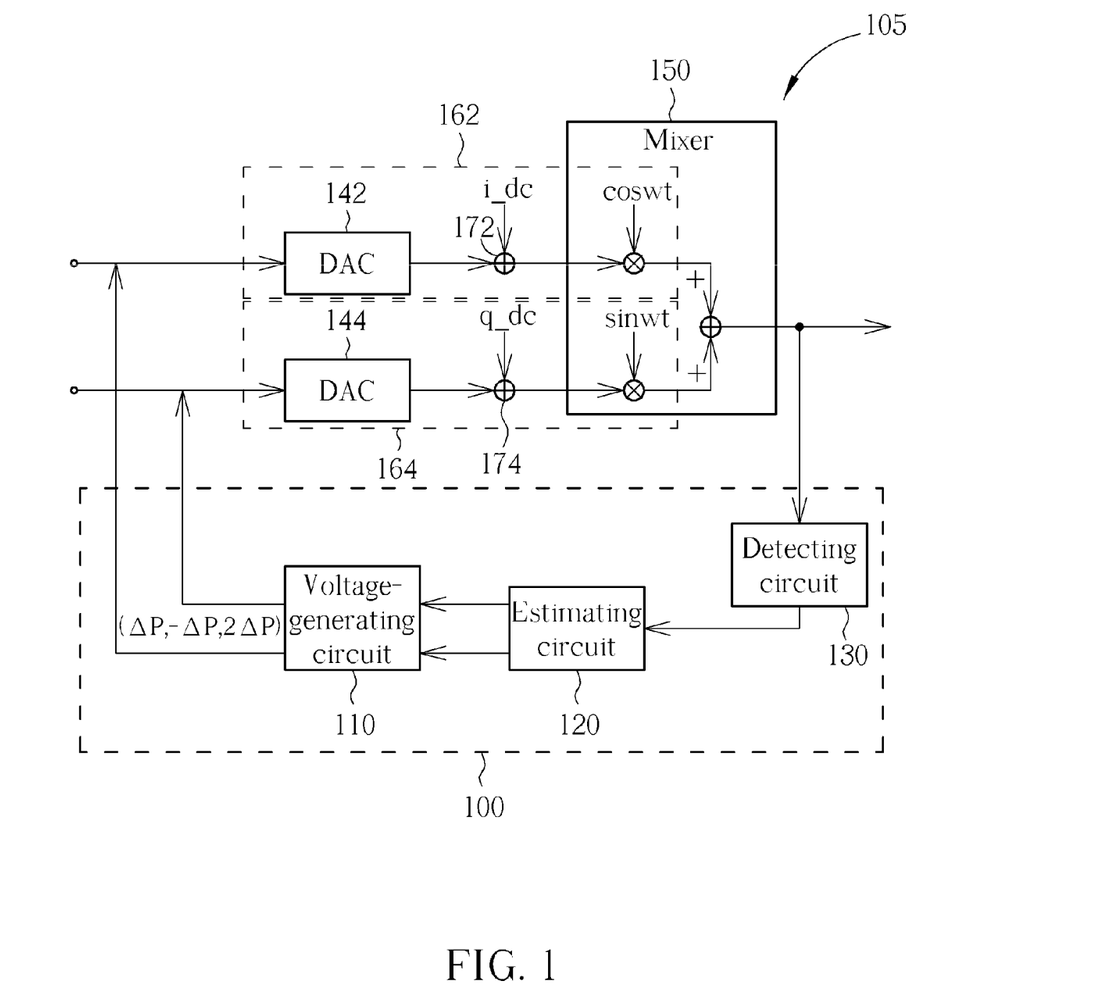
FIG. 1 is a diagram of an estimating circuit applied for calibrating a DC offset at an input of a mixer according to an embodiment of the present invention.

FIG. 1 is a diagram of a calibration circuit 100 applied for calibrating a DC offset at an input of a mixer 150 according to an embodiment of the present invention. As shown in FIG. 1, according to the embodiment of the present invention, the calibration circuit 100 for estimating a DC offset in the wireless communication device 105 comprises a voltage-generating circuit 110, an estimating circuit 120, and a detecting circuit 130. The voltage-generating circuit 110 generates a plurality of test voltage values into an in-phase branch 162 or a quadrature branch 164 of the wireless communication device 105. The test voltage values are converted into analog voltage values through a digital-to-analog converter (DAC) 142 or 144, and the converted analog voltage values are inputted into a mixer 150 together with a DC offset i_dc or q_dc in the wireless communication device 105. Note that the symbols for addition signs 172 and 174 shown in FIG. 1 indicate that signals inputted into the mixer 150 include test voltage values and DC offsets but are not indicative of actual adder circuits. The occurrence of a DC offset may result from a non-ideal effect of a radio-frequency circuit element, the asymmetrical circuit layout, or the circuit mismatch, etc. The detecting circuit 130 then detects an output signal of the mixer 150 and provides reference values corresponding to a power of the output signal for the estimating circuit 120. Compared to the prior art, a difference is that the estimating circuit 120 performs calculations on the reference values of the detecting circuit 130 and the voltage values generated by the voltage-generating circuit 110 according to inferred analysis formulae, to estimate the DC offsets i_dc and q_dc in the wireless communication device 105. Accordingly, the voltage-generating circuit 110 need not repeatedly adjust and regenerate the test signals (i.e., the test voltage values). In a preferred embodiment, for completing the adjustment of the DC offsets to compensate the caused carrier leakage, the calibration circuit 100 only needs to generate six test voltage values at most.

The wireless communication device 105 includes a normal mode and a calibration mode. Under the calibration mode, a base-band module (not shown) of the wireless communication device 105 is disabled, and therefore no base-band signals are inputted into the mixer 150. Under this condition, the calibration circuit 100 is arranged to calibrate the DC offsets occurring in the wireless communication device 105. After the calibration for the DC offsets is finished, the wireless communication device 105 enters the normal mode, and the calibration circuit 100 is disabled while the base-band module is enabled for starting the normal signal transmission function.

In an embodiment under the calibration mode, the wireless communication device 105 disables the base-band module first; in this situation, the output signal of the mixer 150 becomes i_dc·cos wt+q_dc·sin wt due to the DC offsets i_dc and q_dc respectively occurring in the in-phase branch 162 and quadrature branch 164. The detecting circuit 130 detects the output signal of the mixer 150 and then generates an initial reference value $\alpha^2(i\_dc^2+q\_dc^2)/2$ into the estimating circuit 120, wherein the initial reference value is directly proportional to the power of the output signal and the parameter $\alpha$ is a conversion ratio coefficient of the detecting circuit 130. The detecting circuit 130 can be implemented using a power detector or an envelope detector. When the envelope detector is used to implement the detecting circuit 130, a multiplier or an accumulator is necessarily used in conjunction to convert the square of the voltage value of an output signal $\alpha \cdot i\_dc \cdot \cos wt + \alpha \cdot q\_dc \cdot \sin wt$, which is detected by the envelope detector, as the initial reference value $\alpha^2(i\_dc^2+q\_dc^2)/2$ corresponding to the power of the output signal. In other words, when the envelope detector detects that the voltage value of the output signal equals a value m, the square of the voltage value of the output signal is the value m squared by the multiplier, or the square of the voltage value can be derived using the accumulator to accumulate the value m by m times.

The voltage-generating circuit 110 subsequently determines a first voltage value $\Delta p$ according to the magnitude of the initial reference value, e.g. $\Delta p = 2^n \leq \alpha\sqrt{i\_dc^2+q\_dc^2} < 2^{n+1}$, and then inputs the first voltage value $\Delta p$ into the in-phase branch 162 for performing calibration on the DC offset i_dc. If the calibration circuit 100 decides to perform the calibration on the DC offset q_dc first, the voltage-generating circuit 110 shall input the first voltage value $\Delta p$ into the quadrature branch 164. In one embodiment, for determining the first voltage value $\Delta p$, the voltage-generating circuit 110 uses a comparator to compare the initial reference value with the values 1,2,4,8, ..., $2^k$ respectively, instead of using a divider to generate the first voltage value $\Delta p$. Such measures may avoid additional circuit elements and reduce complexity of related operations.

The first voltage value $\Delta p$ is converted to an analog voltage value through the DAC 142 and then the converted analog voltage value is inputted into the mixer 150. Under this condition, the detecting circuit 130 detects that the output signal at an output terminal of the mixer 150 is equal to $\alpha \cdot (i\_dc+\Delta p) \cdot \cos wt + \alpha \cdot q\_dc \cdot \sin wt$, and then generates a first in-phase branch reference value $\alpha^2(i\_dc^2+2 \cdot i\_dc \cdot \Delta p+\Delta p^2+q\_dc^2)/2$ corresponding to the power of the output signal into the estimating circuit 120. Subsequently, the voltage-generating circuit 110 inputs the negative value $-\Delta p$ of the first voltage value into the in-phase branch 162, and then the detecting circuit 130 detects that the output signal of the mixer 150 is equal to $\alpha \cdot (i\_dc-\Delta p) \cdot \cos wt + \alpha \cdot q\_dc \cdot \sin wt$ and generates a second in-phase branch reference value $\alpha^2(i\_dc^2-2 \cdot i\_dc \cdot \Delta p + \Delta p^2+q\_dc^2)/2$ corresponding to the power of the output signal into the estimating circuit 120.

After receiving the above-mentioned first and second in-phase branch reference values, the estimating circuit 120 can estimate the DC offset i_dc occurring on the in-phase branch 162 of the wireless communication device 105 according to the first and second in-phase branch reference values and the first voltage value. According to the above equations, it can be inferred that the DC offset i_dc occurring on the in-phase branch is equal to the difference, between the first in-phase branch reference value and the second in-phase branch reference value, divided by $2 \times \alpha^2 \times \Delta p$. Therefore, the estimating circuit 120 is designed to perform a subtraction on the first in-phase branch reference value and the second in-phase branch reference value (i.e., subtracting the second in-phase branch reference value from the first in-phase branch reference value) to derive a difference, and then calculate the DC offset i_dc occurring on the in-phase branch 162 according to a quotient of the difference value divided by the parameter $\alpha^2$ and then by twice the first voltage value $\Delta p$.

Compared to the prior art, by generating only two test voltage values $\Delta p$ and $-\Delta p$ according to the invention, the calibration circuit 100 can estimate the DC offset i_dc occurring on the in-phase branch 162 using simple mathematical calculations according to the inferred analysis formulae. The steps of estimating the DC offset q_dc occurring on the quadrature branch 164 are similar to those of estimating the DC offset i_dc occurring on the in-phase branch 162, as described above. The voltage-generating circuit 110 orderly inputs the first voltage value $\Delta p$ and the negative value $-\Delta p$ into the quadrature branch 164. The detecting circuit 130 detects the output signal of the mixer 150 when the voltage-generating circuit 110 inputs the first voltage value $\Delta p$ into the quadrature branch 164, in order to generate a first quadrature branch reference value corresponding to the power of the output signal; the detecting circuit 130 detects the output signal of the mixer 150 when the voltage-generating circuit 110 inputs the negative value $-\Delta p$ into the quadrature branch 164, in order to generate a second quadrature branch reference value corresponding to the power of the output signal. The estimating circuit 120 subsequently derives an estimate of the DC offset q_dc occurring on the quadrature branch 164 according to the first quadrature branch reference value, the second quadrature branch reference value, and the first voltage value $\Delta p$. Since the DC offset q_dc can be estimated by inputting two test voltage values into the quadrature branch 164, the calibration circuit 100 only needs to send four test voltage values at most to estimate the DC offsets i_dc and q_dc occurring in the wireless communication device 105. The estimated DC offsets can be used as calibration signals and respectively inputted into the in-phase branch 162 and the quadrature branch 164, to cancel the occurred DC offsets i_dc and q_dc. Therefore, the problems due to the carrier leakage caused by the occurred DC offsets can be solved.

Figure 2:
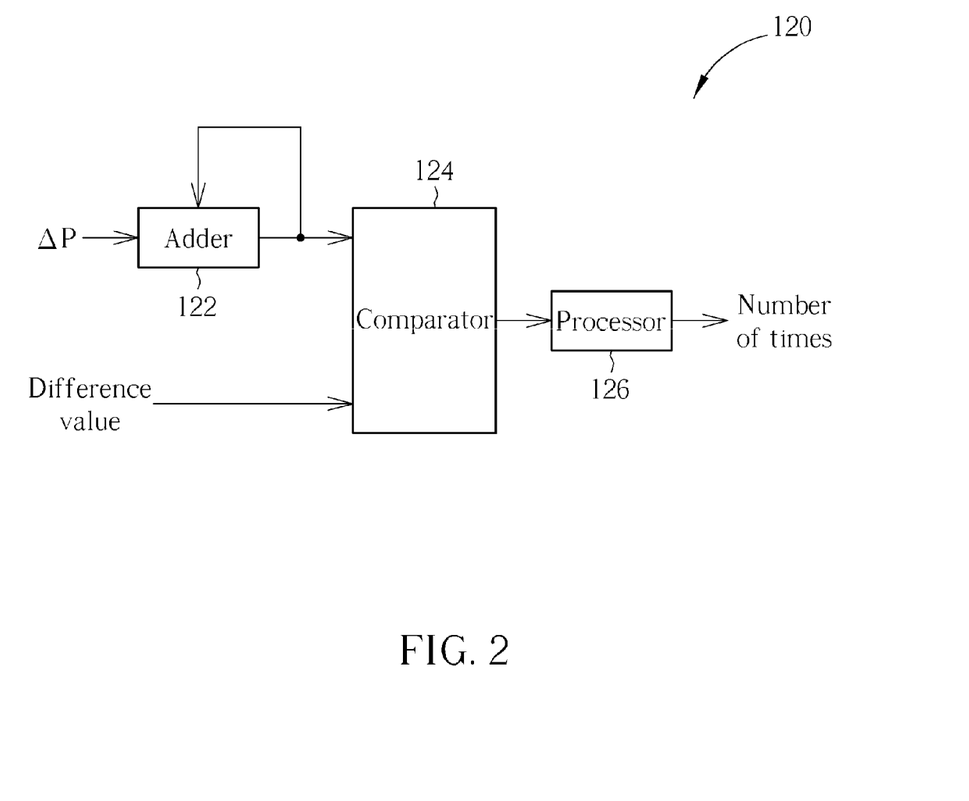
FIG. 2 is an exemplary diagram of a circuit responsible for the division operation within the estimating circuit shown in FIG. 1.

In order to reduce the complexity of the used circuit elements further, in an embodiment, the first voltage value $\Delta p$ is designed as $2^n$ or a selected binary number, and the estimating circuit 120 uses a shift register to perform n shifts on the difference value represented by a binary number system, instead of dividing the difference value by the first voltage value $\Delta p$ using a divider. In another embodiment, as in FIG. 2, the estimating circuit 120 comprises an adder 122, a comparator 124, and a processor 126, wherein the estimating circuit 120 accumulates the first voltage value $\Delta p$ by using the adder 122 and uses the comparator 124 to compare the difference value with an accumulated result each time to derive a difference. When the difference is smaller than a threshold, the processor 126 determines that a current accumulated result approximates or equals the difference value, and then outputs the current accumulated result to generate the estimated DC offsets. For example, suppose that the first voltage value $\Delta p$ equals 4, and a difference value between the first in-phase branch reference value and the second in-phase branch reference value equals 16. After the adder 122 accumulates the first voltage value $\Delta p$ by four times, a current accumulated result equals 16. The comparator 124 determines that the difference between the current accumulated result and the difference value is equal to zero, and then the processor 126 outputs the number of times that the first voltage value $\Delta p$ is accumulated as a quotient of the difference value divided by the first voltage value $\Delta p$. The DC offset i_dc occurring on the in-phase branch can be estimated by dividing the calculation result by $2\alpha^2$.

Figure 3:
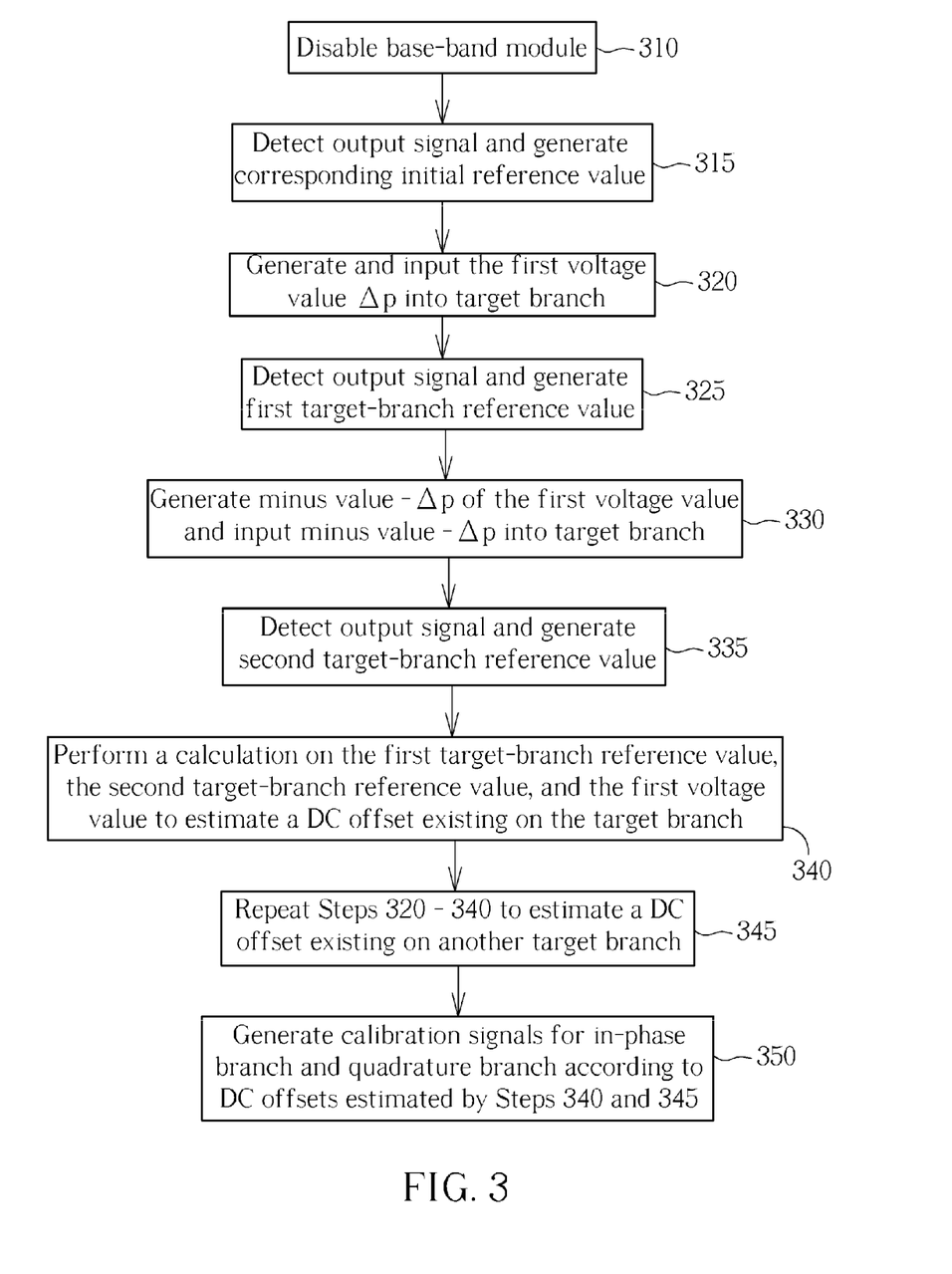
FIG. 3 is a flowchart showing the operation of the estimating circuit shown in FIG. 1 for performing the calibration on the DC offset.

FIG. 3 is a flowchart illustrating the operation of the calibration circuit 100 for performing DC offset calibration according to an embodiment of the present invention. Provided that substantially the same result is achieved, the steps of the operation of the calibration circuit 100 need not be in the exact order as below and need not be contiguous; that is, other steps can be interleaved. The flowchart of the above-mentioned DC offset calibration comprises the following steps. In Step 310, the base-band module is disabled. In Step 315, the output signal of the mixer 150, under a condition that no input signals are inputted to the mixer 150, is detected, and the initial reference value corresponding to the power of the output signal is generated. In Step 320, the first voltage value $\Delta p$ is generated and inputted into a target branch (either the in-phase branch or the quadrature branch) according to the initial reference value, wherein the first voltage value $\Delta p$ can be $2^n$ or a designed binary number. In Step 325, the output signal of the mixer 150 when the first voltage value $\Delta p$ is inputted into the target branch is detected, and the first target-branch reference value corresponding to the power of the output signal is generated. In Step 330, the negative value $-\Delta p$ of the first voltage value is generated and inputted into the target branch. In Step 335, the output signal of the mixer 150 when the negative value $-\Delta p$ of the first voltage value is inputted into the target branch is detected, and the second target-branch reference value corresponding to the power of the output signal is generated. In Step 340, a calculation on the first target-branch reference value, the second target-branch reference value, and the first voltage value is performed to estimate a DC offset on the target branch, wherein the operation of dividing the difference between the first and second target-branch reference values by the first voltage value can be achieved by using a shift register or an accumulation circuit; accordingly, the estimating circuit 120 does not require a divider. In Step 345, Steps 320-340 are repeated to estimate a DC offset on another target branch. In Step 350, calibration signals are generated for the in-phase branch and quadrature branch to cancel the occurred DC offsets according to the DC offsets estimated by Steps 340 and 345, such that carrier leakage occurring in the wireless communication device 105 can comply with the specified communication standard.

Additionally, considering that process errors or process variations may cause the DACs 142 and 144 to become non-ideal circuit elements, another embodiment of the calibration circuit 100 is provided by the present invention. The calibration signals generated by this embodiment are designed to be unaffected by the process errors or process variations of the wireless communication device 105. Thus, the calibration circuit 100 can be applied to the wireless communication device 105 manufactured from a variety of unknown processes and having different unknown digital-to-analog conversion ratio coefficients.

Suppose that the conversion ratio coefficient of the DAC 142 for digital-to-analog conversion is $\beta_1$ and the conversion ratio coefficient of the DAC 144 for digital-to-analog conversion is $\beta_2$, where $\beta_1 \neq \beta_2$. When the first voltage value $\Delta p$ is inputted into the in-phase branch, the detecting circuit 130 detects that the output signal of the mixer 150 is equal to $\alpha \cdot (i\_dc + \beta_1 \cdot \Delta p) \cdot \cos wt + \alpha \cdot q\_dc \cdot \sin wt$, and generates the first in-phase branch reference value, which equals $\alpha^2(i\_dc^2 + 2\beta_1 \cdot i_{dc} \cdot \Delta p + \beta_1^2 \cdot \Delta p^2 + q\_dc^2)/2$, into the estimating circuit 120. In addition, when the negative value $-\Delta p$ of the first voltage value is inputted into the in-phase branch, the detecting circuit 130 detects that the output signal of the mixer 150 is equal to $\alpha \cdot (i\_dc - \beta_1 \cdot \Delta p) \cdot \cos wt + \alpha \cdot q\_dc \cdot \sin wt$, and generates the second in-phase branch reference value, which equals $\alpha^2(i\_dc^2 - 2\beta_1 \cdot i\_dc \cdot \Delta p + \beta_1^2 \cdot \Delta p^2 + q\_dc^2)/2$, to the estimating circuit 120.

Compared to the above-mentioned flowchart, a difference is that the voltage-generating circuit 110 subsequently generates a second voltage value according to the first voltage value $\Delta p$ and then inputs the second voltage value into the in-phase branch. In this embodiment, the second voltage value is selected to be twice the first voltage value, i.e. $2\Delta p$; however, this is not meant to be a limitation to the present invention. For example, the second voltage value can be designed to equal $-2\Delta p$. The detecting circuit 130 then detects the output signal of the mixer 150 to generate a third in-phase branch reference value $\alpha^2(i\_dc^2 - 4\beta_1 \cdot i\_dc \cdot \Delta p + 4\beta_1^2 \cdot \Delta p^2 + q\_dc^2)/2$ corresponding to the power of the output signal, and inputs the third in-phase branch reference value into the estimating circuit 120. In addition to the first and second in-phase branch reference values and the first voltage value, the estimating circuit 120 generates an in-phase branch calibration signal according to the third in-phase branch reference value and the initial reference value; the in-phase branch calibration signal is not influenced by the ratio coefficient α of the detecting circuit 130 and the conversion ratio coefficient $\beta_1$ of the DAC 142.

After performing a subtraction on the first target-branch reference value and the second target-branch reference value to derive a first difference value $\phi_1=2\cdot\alpha^2\cdot\beta_1\cdot i\_dc\cdot\Delta p$, the estimating circuit 120 subtracts the first difference value and initial reference value from the third target-branch reference value to derive a second difference value $\phi_2=2\cdot\alpha^2\cdot\beta_1^2\cdot\Delta p^2$. The estimating circuit 120 then divides the first difference value $\psi_1$ by the second difference value $\psi_2$ and then multiplies the divided first difference value $\psi_1$ by the first voltage value Δp to calculate the calibration signal for calibrating the DC offset i_dc on the in-phase branch. Because of the conversion ratio coefficient $\beta_1$ of the DAC 142, an analog calibration signal −i_dc generated at the output of the DAC 142 (i.e., at the input of the mixer 150) exactly cancels out the DC offset i_dc occurring at the input of the mixer 150 when the calibration signal inputted into the DAC 142 is equal to −i_dc/$\beta_1$. Similarly, by performing the above-mentioned steps on the quadrature branch, an analog calibration signal, which is not influenced by the ratio coefficient α of the detecting circuit 130 and the conversion ratio coefficient $\beta_2$ of the DAC 144, can be generated on the quadrature branch to cancel out the DC offset q_dc occurring on the quadrature branch.

Figure 4:
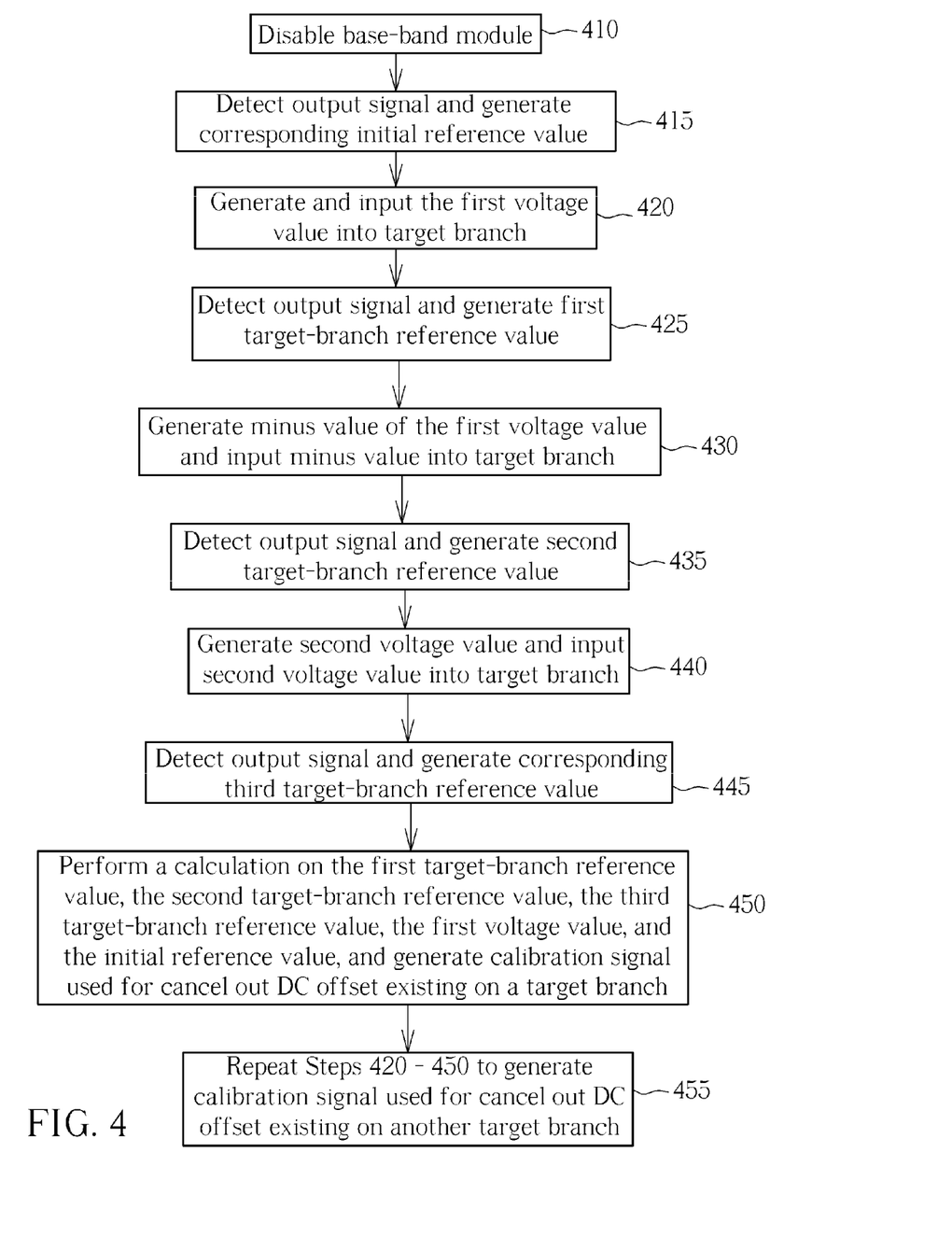
FIG. 4 is another flowchart showing the operation of the estimating circuit shown in FIG. 1 for performing the calibration on the DC offset.

FIG. 4 shows a flowchart of the above-described DC offset calibration. The differences compared to the flowchart shown in FIG. 3 are detailed as below. In Step 440, a second voltage value 2Δp is further generated and inputted into the target branch. In Step 445, detecting the output signal of the mixer 150 is performed when the second voltage value 2Δp is inputted into the target branch, and then the third target-branch reference value corresponding to the power of the output signal is generated. In Step 450, a calculation on the first, second, and third target-branch reference values, the first voltage value, and the initial reference value is performed, to generate the calibration signal used for cancelling out the DC offset occurring on the target branch. In Step 455, Steps 420-450 are repeated to generate another calibration signal utilized for cancelling out the DC offset on another target branch.

Likewise, the operation of multiplying the first voltage value Δp can be implemented by performing n shifts on a multiplicand represented by the binary number system when the estimating circuit 120 generates the calibration signal. Also, the operation of dividing a dividend by the second difference value $\psi_2$ can be achieved by accumulating the second difference value $\psi_2$ and comparing the dividend with an accumulated result to derive a difference, wherein a current accumulation number of times is taken for a division result when the difference is smaller than a threshold. For the estimating circuit 120, the multiplier and divider therefore can be replaced by a shift register and an accumulation circuit respectively.

Additionally, when the conversion ratio coefficient $\beta_1$ of the DAC 142 equals the conversion ratio coefficient $\beta_2$ of the DAC 144, the third target-branch reference values corresponding to the in-phase and quadrature branches are the same; thus, it is only necessary to input the second voltage value into a target branch such as the in-phase branch. One of the third target-branch reference values generated by the detecting circuit 130 can be used for generating calibration signals for the in-phase and quadrature branches respectively. That is, it is only required to execute Steps 440 and 445 once; repeating Steps 440 and 445 is not required. Consequently, the calibration circuit 100 can generate the calibration signals uninfluenced by the process variations or other factors after inputting five or six test voltage values.

The above embodiments implement the estimating circuit 120 for estimating DC offsets in the digital way, and employ unsophisticated mathematical calculations to derive DC offsets at the radio-frequency transmitting ends, for sending calibration signals, which are regarded as negative values of the occurred DC offsets, onto the transmitting paths. Compared to the prior art, the calibration signals in the embodiments of the present invention are converged much faster. The DC offsets on the in-phase and quadrature branches can be estimated by sending only four test voltages. Even taking the inaccuracy of the DACs 142 and 144 into consideration, the accurate calibration signals can be generated by sending only five or six test voltages in total.

Furthermore, for completing all the calculations, the calibration circuit 100 does not require a divider for implementation, and does not require a multiplier for implementation when the detecting circuit 130 is implemented by a power detector. Moreover, even though the detecting circuit 130 is an envelope detector, a required multiplier can be replaced by an accumulator, such that the calibration circuit 100 can be implemented using a simple and easily implemented circuit architecture.

Those skilled in the art will readily observe that numerous modifications and alterations of the device and method may be made while retaining the teachings of the invention.

What is claimed is:

1. A method for estimating a direct current (DC) offset in a wireless communication device, comprising:
   generating a first voltage value;
   detecting an output signal of the wireless communication device by inputting the first voltage value into a target branch of the wireless communication device to generate a first target-branch reference value;
   detecting the output signal of the wireless communication device by inputting a negative value of the first voltage value into the target branch to generate a second target-branch reference value; and
   estimating a DC offset on the target branch of the wireless communication device according to the first target-branch reference value, the second target-branch reference value, and the first voltage value.

2. The method of claim 1, wherein the target branch comprises an in-phase branch or a quadrature branch.

3. The method of claim 1, wherein the step of detecting the output signal of the wireless communication device to generate the first target-branch reference value comprises:
   detecting a voltage magnitude of the output signal of the wireless communication device to generate a first output voltage value; and
   accumulating the first output voltage value by m times to derive the first target-branch reference value, wherein m is a magnitude of the first output voltage value; and
   the step of detecting the output signal of the wireless communication device to generate the second target-branch reference value comprises:
   detecting a voltage magnitude of the output signal of the wireless communication device to generate a second output voltage value; and
   accumulating the second output voltage value by n times to derive the second target-branch reference value, wherein n is a magnitude of the second output voltage value.

4. The method of claim 1, wherein the step of estimating the DC offset on the target branch of the wireless communication device according to the first target-branch reference value, the second target-branch reference value, and the first voltage value comprises:
  performing a subtraction on the first target-branch reference value and the second target-branch reference value to derive a difference value; and
  generating an estimated DC offset on the target branch according to a quotient of the difference value divided by the first voltage value.

5. The method of claim 4, wherein the step of generating the estimated DC offset on the target branch according to the quotient of the difference value divided by the first voltage value comprises:
  dividing the difference value by the first voltage value and a conversion ratio coefficient of the detecting circuit to derive the estimated DC offset on the target branch.

6. The method of claim 4, wherein the first voltage value equals $2^n$, n is an integer, and the quotient of the difference value divided by the first voltage value is generated by representing the difference value using a binary number system and performing n shifts on the difference value.

7. The method of claim 4, wherein the step of generating the estimated DC offset on the target branch according to the quotient of the difference value divided by the first voltage value comprises:
  accumulating the first voltage value to derive an accumulated result, recording a current number of times that the first voltage value is accumulated, and comparing the accumulated result and the difference value to calculate a difference; and
  when the difference is smaller than a threshold, generating the estimated DC offset on the target branch according to the current number of times.

8. The method of claim 1, further comprising:
  detecting the output signal of the wireless communication device to generate an initial reference value corresponding to the power of the output signal under a condition of no input voltages;
  generating a second voltage value according to the first voltage value;
  inputting the second voltage value into the target branch, and detecting the output signal of the wireless communication device to generate a third target-branch reference value corresponding to the power of the output signal; and
  the step of estimating the DC offset on the target branch according to the first target-branch reference value, the second target-branch reference value, and the first voltage value comprises:
  generating a target-branch calibration signal used for calibrating the DC offset on the target branch according to the initial reference value, the first target-branch reference value, the second target-branch reference value, the third target-branch reference value, and the first voltage value.

9. The method of claim 8, wherein the second voltage value is twice the first voltage value.

10. The method of claim 8, wherein the step of generating the target-branch calibration signal comprises:
  performing a subtraction on the first target-branch reference value and the second target-branch reference value to derive a first difference value;
  subtracting the first difference value and the initial reference value from the third target-branch reference value to derive a second difference value; and
  deriving the target-branch calibration signal according to a product by multiplying a quotient of the first difference value divided by the second difference value with the first voltage value.

11. A circuit for estimating a direct current (DC) offset in a wireless communication device, comprising:
  a voltage-generating circuit, for generating a first voltage value and a negative value of the first voltage value, and orderly inputting the first voltage value and the negative value of the first voltage value into a target branch of the wireless communication device;
  a detecting circuit, for detecting an output signal of the wireless communication device to generate a first target-branch reference value corresponding to a power of the output signal when the voltage-generating circuit inputs the first voltage value into the target branch, and detecting the output signal of the wireless communication device to generate a second target-branch reference value corresponding to the power of the output signal when the voltage-generating circuit inputs the negative value of the first voltage value into the target branch; and
  an estimating circuit, coupled to the voltage-generating circuit and the detecting circuit, for estimating a DC offset on the target branch of the wireless communication device according to the first target-branch reference value, the second target-branch reference value, and the first voltage value.

12. The circuit of claim 11, wherein the target branch comprises an in-phase branch or a quadrature branch.

13. The circuit of claim 11, wherein the detecting circuit detects a voltage magnitude of the output signal of the wireless communication device to generate a first output voltage value and accumulates the first output voltage value by m times to derive the first target-branch reference value when generating the first target-branch reference value, wherein m is a magnitude of a voltage of the output signal; and the detecting circuit detects the voltage magnitude of the output signal of the wireless communication device to generate a second output voltage value and accumulates the second output voltage value by n times to derive the second target-branch reference value when generating the second target-branch reference value, wherein n is a magnitude of the second output voltage value.

14. The circuit of claim 11, wherein the estimating circuit performs a subtraction on the first target-branch reference value and the second target-branch reference value to derive a difference value, and generates an estimated DC offset on the target branch according to a quotient of the difference value divided by the first voltage value.

15. The circuit of claim 14, wherein the estimating circuit divides the difference value by the first voltage value and a conversion ratio coefficient of the detecting circuit to derive the estimated DC offset on the target branch.

16. The circuit of claim 14, wherein the first voltage value equals $2^n$, n is an integer, and the estimating circuit comprises a shift register for performing n shifts on the difference value represented by a binary number system to derive the estimated DC offset on the target branch.

17. The circuit of claim 14, wherein the estimating circuit comprises:
  an adder, for accumulating the first voltage value to derive an accumulated result;
  a comparator, coupled to the adder, for comparing the accumulated result with the difference value to calculate a difference; and
  a processor, coupled to the adder and the comparator, for recording a current number of times that the first voltage value is accumulated, and generating the estimated DC offset on the target branch according to the number of times when the difference is smaller than a threshold.

18. The circuit of claim 11, wherein the detecting circuit further detects the output signal of the wireless communication device to generate an initial reference value corresponding to the power of the output signal under a condition of no input voltages; the voltage-generating circuit further generates a second voltage value according to the first voltage value and inputs the second voltage value into the target branch; and the detecting circuit detects the output signal of the wireless communication device to generate a third target-branch reference value corresponding to the power of the output signal, and the estimating circuit generates a target-branch calibration signal used for calibrating the DC offset on the target branch according to the initial reference value, the first target-branch reference value, the second target-branch reference value, the third target-branch reference value, and the first voltage value.

19. The circuit of claim 18, wherein the second voltage value is twice the first voltage value.

20. The circuit of claim 18, wherein the estimating circuit performs a subtraction on the first target-branch reference value and the second target-branch reference value to derive a first difference value, subtracts the first difference value and the initial reference value from the third target-branch reference value to derive a second difference value, and derives the target-branch calibration signal according to a product by multiplying a quotient of the first difference value divided by the second difference value with the first voltage value.

* * * * *